(12) United States Patent
Tolgu et al.

(10) Patent No.: US 7,908,611 B2
(45) Date of Patent: Mar. 15, 2011

(54) UNMANAGED PROGRAMMING LANGUAGE INTEROPERABILITY WITH MANAGED INTERNET PROTOCOL CONTEXT

(75) Inventors: Karl Tolgu, Seattle, WA (US); Ahmad M. El Husseini, Kirkland, WA (US); Dmitry Zhiyanov, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1137 days.

(21) Appl. No.: 11/378,934

(22) Filed: Mar. 17, 2006

(65) Prior Publication Data

US 2007/0220158 A1 Sep. 20, 2007

(51) Int. Cl.
*G06F 9/46* (2006.01)
*G06F 15/16* (2006.01)
*G06F 9/44* (2006.01)

(52) U.S. Cl. ........ 719/330; 709/203; 709/218; 709/227; 717/106

(58) Field of Classification Search .................. None
See application file for complete search history.

(56) References Cited

U.S. PATENT DOCUMENTS

| | | | |
|---|---|---|---|
| 6,041,362 A | 3/2000 | Mears et al. | |
| 6,167,564 A | 12/2000 | Fontana et al. | |
| 6,334,158 B1 | 12/2001 | Jennyc et al. | |
| 6,360,249 B1 | 3/2002 | Courts et al. | |
| 6,393,456 B1 | 5/2002 | Ambler et al. | |
| 6,484,177 B1 | 11/2002 | Van Huben et al. | |
| 6,754,672 B1 | 6/2004 | McLauchlin | |
| 6,854,120 B1 | 2/2005 | Lo et al. | |
| 6,981,222 B2 | 12/2005 | Rush et al. | |
| 2001/0042092 A1 | 11/2001 | Kudo et al. | |
| 2002/0099583 A1 | 7/2002 | Matusek et al. | |
| 2002/0111820 A1 | 8/2002 | Massey | |
| 2002/0198800 A1 | 12/2002 | Shamrakov | |
| 2003/0172371 A1 | 9/2003 | Offenmuller | |
| 2003/0217035 A1 | 11/2003 | Lai | |
| 2003/0236859 A1* | 12/2003 | Vaschillo et al. | 709/218 |
| 2004/0010496 A1 | 1/2004 | Behrendt et al. | |
| 2005/0033588 A1 | 2/2005 | Ruiz et al. | |
| 2005/0049882 A1 | 3/2005 | Sawka | |
| 2005/0216594 A1* | 9/2005 | O'Brien et al. | 709/227 |

FOREIGN PATENT DOCUMENTS

WO    WO 00/57311    9/2000

OTHER PUBLICATIONS

2005 Microsoft Business Solutions for CPAs, Axapta Chapter 5, Jul. 2005, Accounting Software Advisor, LLC, pp. 1-24.*

(Continued)

*Primary Examiner* — Andy Ho
*Assistant Examiner* — Tuan Dao
(74) *Attorney, Agent, or Firm* — Marshall, Gerstein & Borun LLP

(57) ABSTRACT

Methods and systems access managed Internet protocol context information by receiving an unmanaged Internet protocol context class call from an Internet application written in an unmanaged programming language. An unmanaged Internet protocol context class, which is written in an unmanaged programming language, is instantiated in response to the call. Interaction with a managed Internet protocol context class results in receiving Internet protocol context information. The managed Internet protocol context class corresponds to the unmanaged Internet protocol context class.

19 Claims, 5 Drawing Sheets

OTHER PUBLICATIONS

Bussler, Christoph et al., "A Conceptual Architecture for Semantic Web Enabled Web Services," *SIGMOD Record*, vol. 31, No. 4, pp. 24-29 (Dec. 2002).

Bussler, Christoph, "The Role of Semantic Web Technology in Enterprise Application Integration," *IEEE*, pp. 1-7 (2003).

"Enterprise Resource Planning: Enterprise Business Adapter," [online], [retrieved Jan. 9, 2006], retrieved from the Internet: <URL:http://www.mindtree.com/erp/businesss-adapter.php>.

Lee, Jinyoul, et al., "Enterprise Integration with ERP and EAI," *Communications of the ACM*, vol. 46, No. 2, pp. 54-60 (Feb. 2003).

Shelp, Joachim, et al., "Extending the Business Engineering Framework for Application Integration Purposes," *2005 ACM Symposium on Applied Computing*, pp. 1333-1337 (2005).

"Supply Chain and ERP Integration," [online], [retrieved Jan. 9, 2006], retrieved from the Internet: <URL:http://www.seagullsoftware.com/solutions/business/supplychain_erp.html>.

Themisteocleous, Marinos, et al., "ERP Problems and Application Integration Issues: An Empirical Survey," *Proceedings of the 34th Hawaii International Conference on System Sciences -2001, © IEEE*, pp. 1-10 (2001).

* cited by examiner

UNMANAGED PROGRAMMING LANGUAGE INTEROPERABILITY WITH MANAGED INTERNET PROTOCOL CONTEXT

BACKGROUND

Integration of Internet-based systems and applications is an important feature of any server-based product that automates processes and manages data. In particular, with an enterprise resource planning (ERP) system, there is often a need to support systems and applications that are based upon Internet-development technology different from the programming language utilized by the ERP system. For example, Internet-based applications, including Internet-based portals (e.g., Internet pages), have an important role in delivering ERP capabilities via Internet browsers. Internet application and pages have been built using unmanaged active server page (ASP) technology, although many Internet-related infrastructural services and components may be based on managed code, such as Internet Information Services (IIS) 6.0 and ASP.NET. ASP.NET is a dynamic Internet development technology that is based upon .NET framework and Common Language Runtime (CLR), which is a managed platform. Generally, managed code is programming code that has its execution managed by a generalized multi-language, reflective execution engine, such as the .NET framework CLR. By contrast, any programming language that is not a managed code may be referred to as an unmanaged programming language, such as X++.

In order to facilitate Internet-based use, an ERP should be able to access Internet protocol context information from the Internet infrastructure, such as information on sessions, requests, cookies, etc. For example, the ERP should be able to access HTTP context information from the Internet protocol context of any managed dynamic Internet development technology tool, such as the HTTP context of ASP.NET. As such, an ERP should have the ability to interoperate with managed Internet infrastructure and access managed Internet protocol contexts from an unmanaged programming language in order to enable Internet-based functionality within unmanaged programming languages.

SUMMARY

An interoperability component allows managed active server page Internet applications to be built from an unmanaged programming language and to interact with a managed dynamic Internet development technology tool using unmanaged Internet protocol context classes. Broadly, an unmanaged Internet protocol context class is instantiated in response to an unmanaged Internet protocol context call from an Internet application. Interaction with a managed Internet protocol context class that corresponds to the unmanaged Internet protocol context class allows retrieval of managed Internet protocol context information. The use of these unmanaged Internet protocol context classes is expected to help facilitate the integration between Internet applications implemented from an unmanaged programming language and managed Internet protocol context.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
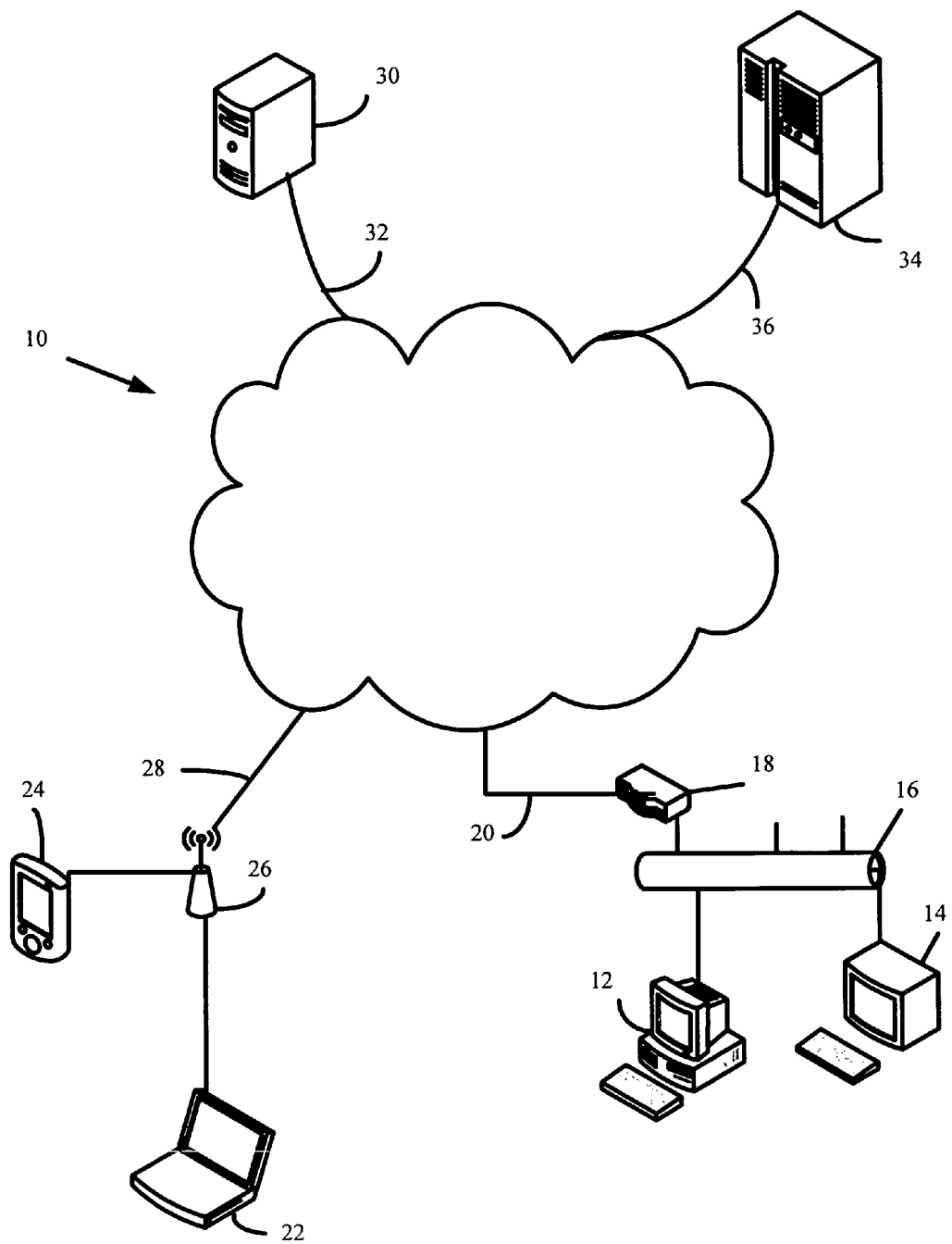
FIG. 1 is a simplified and representative block diagram of a computer network.
Figure 2:
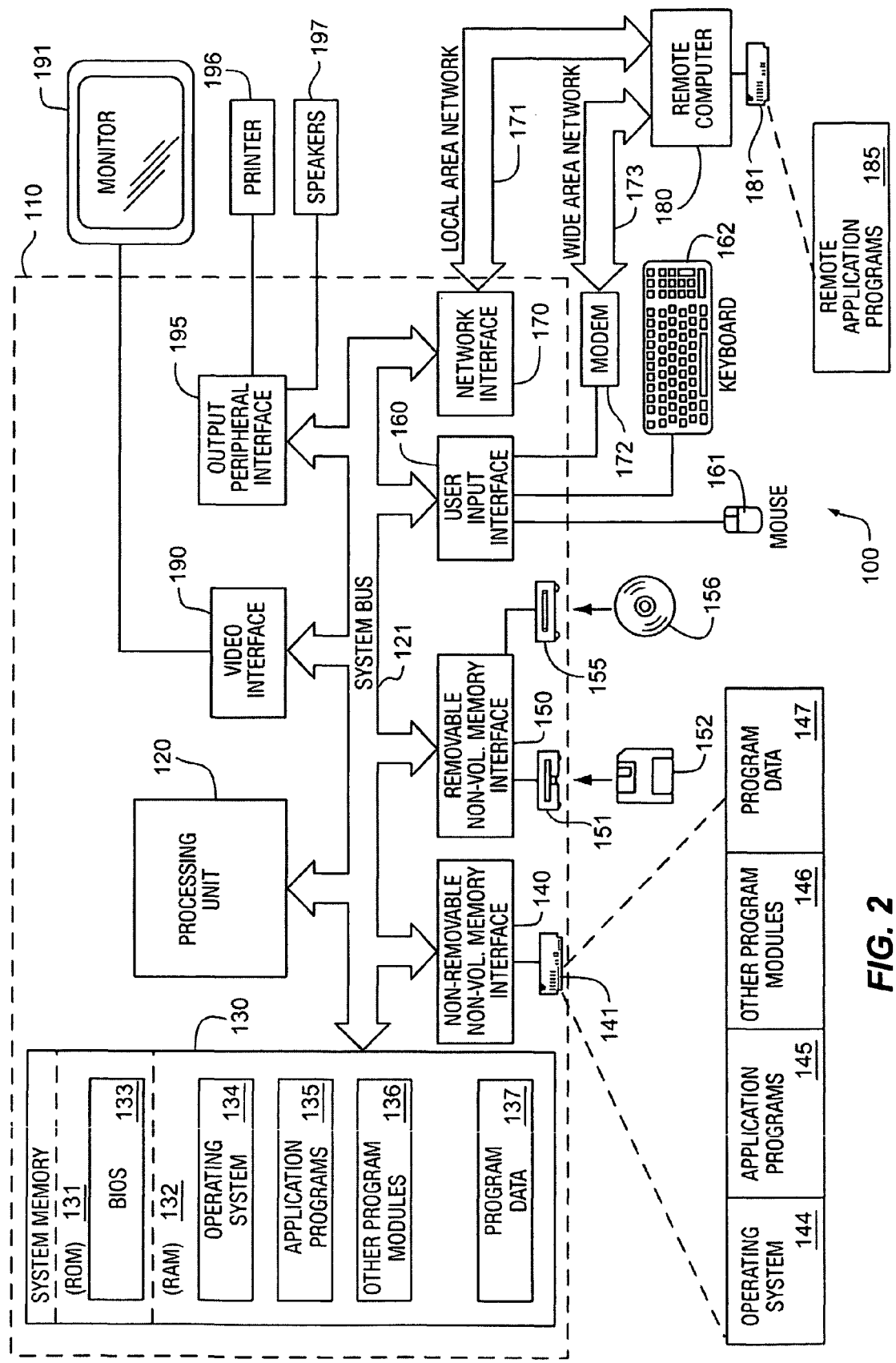
FIG. 2 is a block diagram of a computer that may be connected to the network of FIG. 1.

FIGS. 1 and 2 provide a structural basis for the network and computational platforms related to the instant disclosure.

FIG. 1 illustrates a network 10. The network 10 may be the Internet, a virtual private network (VPN), or any other network that allows one or more computers, communication devices, databases, etc., to be communicatively connected to each other. The network 10 may be connected to a personal computer 12, and a computer terminal 14 via an Ethernet 16 and a router 18, and a landline 20. The Ethernet 16 may be a subnet of a larger Internet Protocol network. Other networked resources, such as projectors or printers (not depicted), may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programmings 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programmings 145, other program modules 146, and program data 147. Note that these components can either be the same as or different from operating system 134, application programmings 135, other program modules 136, and program data 137. Operating system 144, application programmings 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. A camera 163, such as Internet camera (Internetcam), may capture and input pictures of an environment associated with the computer 110, such as providing pictures of users. The Internetcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 2 illustrates remote application programmings 185 as residing on memory device 181.

The communications connections 170, 172 allow the device to communicate with other devices. The communications connections 170, 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
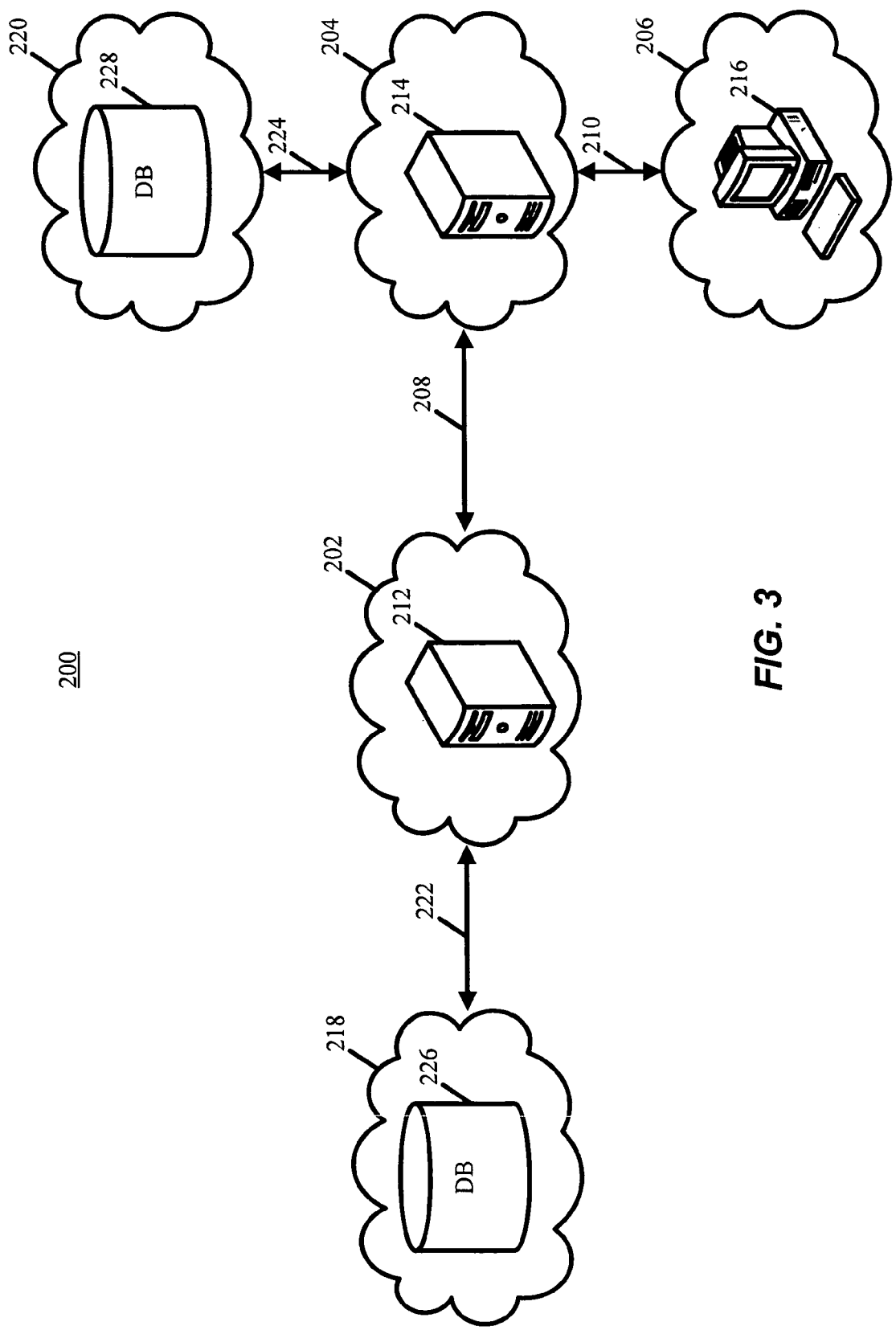
FIG. 3 is a representative block diagram of a system for integrating managed Internet protocol context with unmanaged programming language.

FIG. 3 may depict an exemplary client/server network 200, such as an enterprise resource planning system, that may be similar to or coupled to the network 10 of FIG. 1. A client/server network 200 may include individual systems 202, 204, 206 coupled by networks 208, 210. The networks 208, 210 may be wired or wireless and may support Internet protocol version 6 (IPv6) and secure dedications protocol, such as secured sockets layer (SSL). In one example, the Internet may be utilized as one or more of the networks 208, 210. System 202 is a server system which may include one server 212 or multiple servers. In one example, the server 212 is an application server. The server system 202 may be an enterprise resource planning (ERP) system or other business enterprise server system, an application server, an SQL or other database management server system, or a messaging and enterprise collaboration server system, though different server types or server utilizations may be included.

System 204 is another server system which may include one or more servers 214. In one example, the server system 204 is an Internet server system 204, such as an Internet Information Services (IIS) system, which may provide a set of Internet-based services for other systems. The Internet server system 204 may include an interoperability component to enable integration between managed dynamic Internet development technology tools, such as managed active server page Internet development technology (e.g., ASP.NET), and Internet applications built using an unmanaged programming language, such as X++. The interoperability component may facilitate the execution of Internet-related requests from a client for managed Internet protocol context information, such as managed active server page HTTP context information, from an unmanaged programming language (e.g., X++). In other words, the interoperability component may be provided as a mechanism through which managed Internet protocol context is integrated with an unmanaged programming language. As such, a managed Internet protocol context (e.g., ASP.NET HTTP context) may be directly accessed from the unmanaged programming language (e.g., X++) to access managed Internet protocol context information (e.g., ASP.NET HTTP context information). As is known, HTTP is a request/response Internet protocol between clients and servers. HTTP context information may include any Internet-related information, such as information on sessions, requests, cookies, etc.

Generally, managed refers to a method of cooperation between executing code and the runtime, such that at any point of execution, the runtime may stop an executing processor and retrieve information specific to the current processor instruction address. As such, managed code may be any code or programming language that has its execution managed by a generalized multi-language, reflective execution engine. By contrast, unmanaged may refer to anything that is not managed. For example, unmanaged code may be any code or programming language that is not managed.

The server 214 within the Internet server system 204 may be an Internet server 214, such as an Internet application server. In one example, the server 214 may be a HyperText Transfer Protocol (HTTP) server as part of the Internet Information Services (IIS). An HTTP client, such as a Internet browser or another Internet-related application, may initiate a request by establishing a connection to the Internet server system 204 or to the server system 202 via the Internet server system 204. The server 214 may wait for the client to send a request string, and upon receiving the request string, the server 214 may send back a response string. Although the following disclosure primarily discusses request/response Internet protocol context information, such as HTTP and HTTP context information, the Internet server system 204 may include servers 214 for File Transfer Protocol (FTP), Simple Mail Transfer Protocol (SMTP), Network News Transfer Protocol (NNTP) and HyperText Transfer Protocol Secure (HTTPS), for example.

System 206 is a client system that includes a network communication device 216, including, but not limited to, a personal computer, telephone, a personal digital assistant, a set-top box, television, and entertainment system, and the like. In one example, the network communication device 216 may include, or be operatively coupled to, a client application, such as an Internet browser. The client application may be used to view or access an Internet application. The Internet application may be a managed active server page, such as an ASP.NET page, or a managed active server page application, such as an ASP.NET application. As explained further below, the Internet application may be based on a platform provided by a managed dynamic Internet development technology tool, but built using an unmanaged programming language, such as X++.

In addition to systems 202, 204, 206, the client/server network 200 may further include systems 218, 220. System 218 is operatively coupled to server system 202 via a network 222, and system 220 is operatively coupled to internet server system 204 via a network 224. The networks 222, 224 may be wired or wireless and may support Internet protocol version 6 (IPv6) and secure dedications protocol, such as secured sockets layer (SSL). Each of systems 218, 220 includes a database 226, 228 operatively coupled to the respective systems 202, 204. For example, data within the database 226 may be managed by the server system 202 and/or applications stored within the database 226 may be accessed by the server system 202. Likewise, data within the database 228 may be managed by the Internet server system 204 and/or applications stored within the database 228 may be accessed by the Internet server system 204.

In one example, using the above system 200, Internet applications may be built based on managed dynamic Internet development technology using an unmanaged programming language by accessing Internet related information from the Internet server system 204, and more specifically from the Internet server 214. For example, managed active server page (e.g., ASP.NET) Internet pages or applications may be built using X++, which is an unmanaged programming language. Specifically, managed active server page Internet development technology tools, such as Internet development technology tools provided by ASP.NET, provides a specific set of Internet information which may be provided to build Internet applications. An Internet application built using an unmanaged programming language may include a series of calls, each of which may call an unmanaged class. In particular, the calls may relate to calls for unmanaged Internet protocol context classes, such as X++HTTP context classes, which may interact with managed Internet protocol context classes, such as managed active server page (e.g., ASP.NET) HTTP context classes. As a result, the managed Internet application or managed Internet page may leverage application logic (e.g., business logic) written in an unmanaged programming language (e.g., X++) and data residing within, or available through, the server system 202, because the Internet application (e.g., application or page) is implemented in the unmanaged programming language.

The above system 200 may further be used to integrate a managed Internet protocol context, such as managed active server page (ASP.NET) HTTP context with the unmanaged programming language of the Internet application or page. In particular, managed Internet protocol context information may be accessed directly from the unmanaged programming language. For example, when the client system 206 initiates (e.g., opens) a browser, the initiating of the browser is translated in the Internet server system 204 as a request to view an Internet page. The Internet page may be a managed active server page and/or may invoke a managed active server page application built with the unmanaged programming language, as described above. For example, the client may be presented with an Internet form. When the client manipulates the form and submits the changes, the Internet server system 204 may execute and access code that calls unmanaged Internet protocol context classes to access managed Internet protocol context information and execute any steps for executing the form which is written in the unmanaged programming language.

Although the client system 206 is shown to include one network communication device 216, it should be understood that different numbers of network communication devices may be utilized. Likewise, the server system 202 and the Internet server system 204 may include different numbers of servers and the database systems 218, 220 may include different numbers of databases. Further, while the server 212, the Internet server 214, the network communication device 216 and the databases 226, 228 are each shown to be provided within their own systems 202, 204, 206, 218, 220, it should be understood that the server 212, the Internet server 214, the network communication device 216 and/or the databases 226, 228 may be provided within the same system. It should also be understood that multiple systems may be provided, including dozens or hundreds of Internet server systems 204 and hundreds or thousands of client systems 206. Although the following disclosure generally describes the interaction between one Internet server system 204, and in particular one Internet server 214, and one client system 204, it should be understood that multiple servers may operate simultaneously, each with one or more client network communication devices and/or with one or more client systems.

Figure 4:
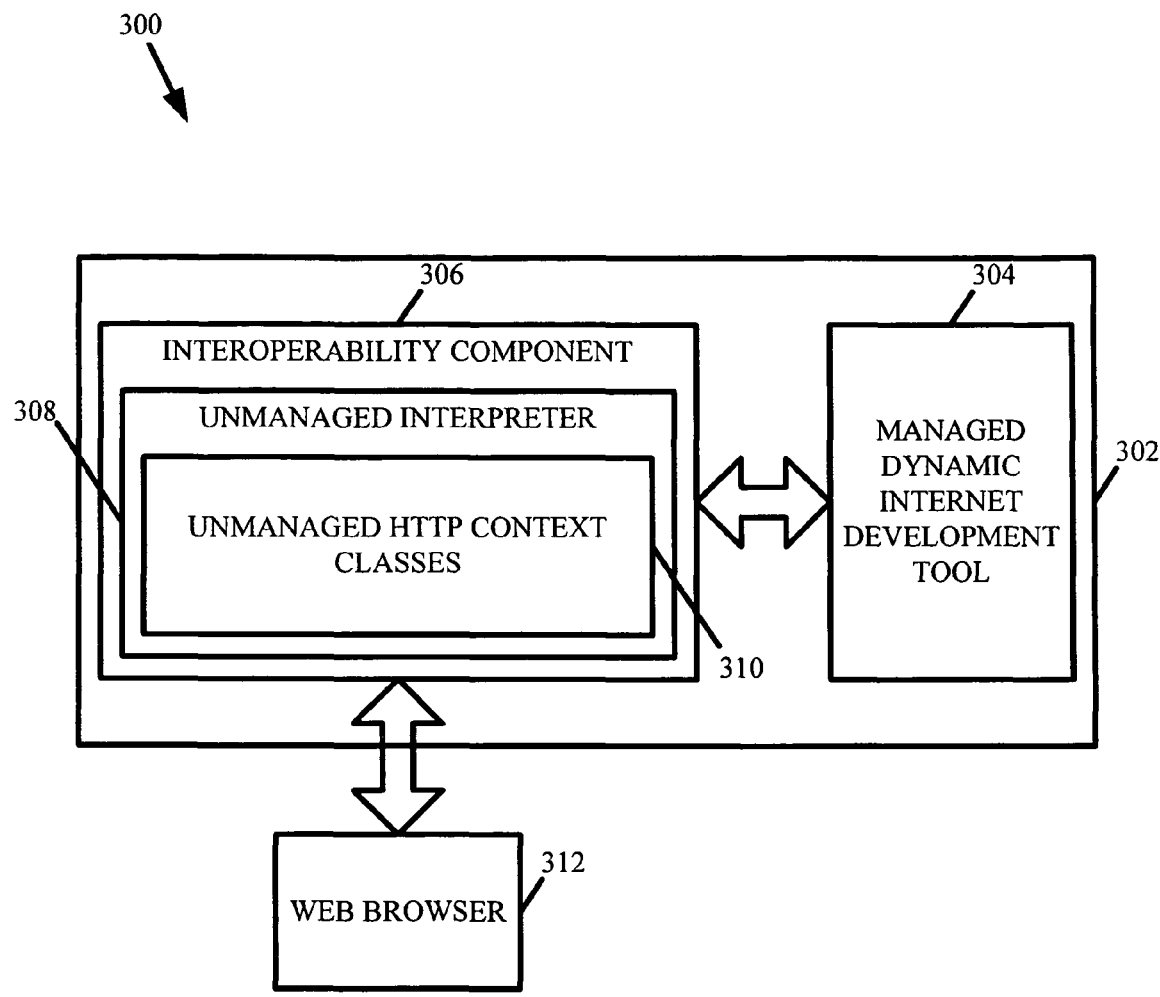
FIG. 4 is a representative block diagram of an Internet server and a client Internet browser.

FIG. 4 represents a more detailed block diagram 300 of the Internet server system 204 and the client system 206. In particular, FIG. 4 represents a more detailed block diagram 300 of an Internet information server 302 and a client application 312 resident on, or operatively coupled to, the network communication device 216. Referring to FIG. 4, an Internet information server 302 hosts managed Internet development technology tools 304, and, in particular, managed dynamic Internet page development technology tools, such as managed active server page (e.g., ASP.NET) technology tools. The managed Internet development technology tools includes managed Internet protocol context information, such as managed active server page HTTP context information which may be accessed or retrieved via associated managed Internet protocol context information classes (e.g. managed active server page HTTP context classes).

The Internet information server 302 further hosts an interoperability component 306. The interoperability component 306 includes an unmanaged interpreter 308, such as an X++interpreter. Unmanaged Internet protocol context classes 310, such as X++HTTP context classes, are accessible through the unmanaged interpreter 308. Each of the unmanaged Internet protocol context classes 310 generally corresponds to an equivalent managed Internet protocol context class. As such, the unmanaged Internet protocol context classes 310 may be accessed and used to access managed Internet protocol context information via the corresponding managed Internet protocol context classes. In other words, the unmanaged Internet protocol context classes 310 that are used to access the managed dynamic Internet development technology tools 304 are native, as opposed to wrappers. Any managed objects (e.g., managed active server page objects) that are accessed using the unmanaged Internet protocol context classes 310 are represented as native objects and are accessed natively.

The unmanaged Internet protocol context classes may include, but are not limited to, IISResponse, IISRequest, IISServer, IISApplicationObject, IISSessionObject, IISRequestDictionary, IISVariantDictionary, IISStringList, IISReadCookie, IISWriteCookie, IISViewState and IISPostedFile. Corresponding managed Internet protocol context classes to which the above unmanaged Internet protocol context classes may include, but are not limited to, HTTPRequest, HTTPResponse and HTTPSession. Each of the unmanaged Internet protocol context classes are mapped to an equivalent managed Internet protocol context class.

By building unmanaged Internet protocol context classes, managed Internet pages and Internet applications based on the managed dynamic Internet development technology may be implemented in an unmanaged programming language. The interoperability component 306 may marshal unmanaged Internet protocol context class calls to the managed Internet development tools 304. In other words, the call instantiates an unmanaged Internet protocol context class, which corresponds to an equivalent managed Internet protocol context class, thereby allowing direct interaction with managed Internet protocol context classes to access managed Internet protocol context information. The resulting Internet pages and Internet applications are managed but implemented in an unmanaged programming language.

An Internet browser 312 resident on, or accessible by, the network communication device 216, interacts with the interoperability component 306 by invoking managed Internet development code, such as managed active server page code. The managed Internet development code may be invoked through rendered Internet pages on the browser 312. Because the Internet page or application is a managed Internet page/application implemented using an unmanaged programming language, the Internet browser 312 may execute the unmanaged programming language when invoking the managed Internet development code. The use of the unmanaged Internet protocol context classes enables interoperability with the Internet server 302 and with the managed dynamic Internet development tools 304.

Figure 5:
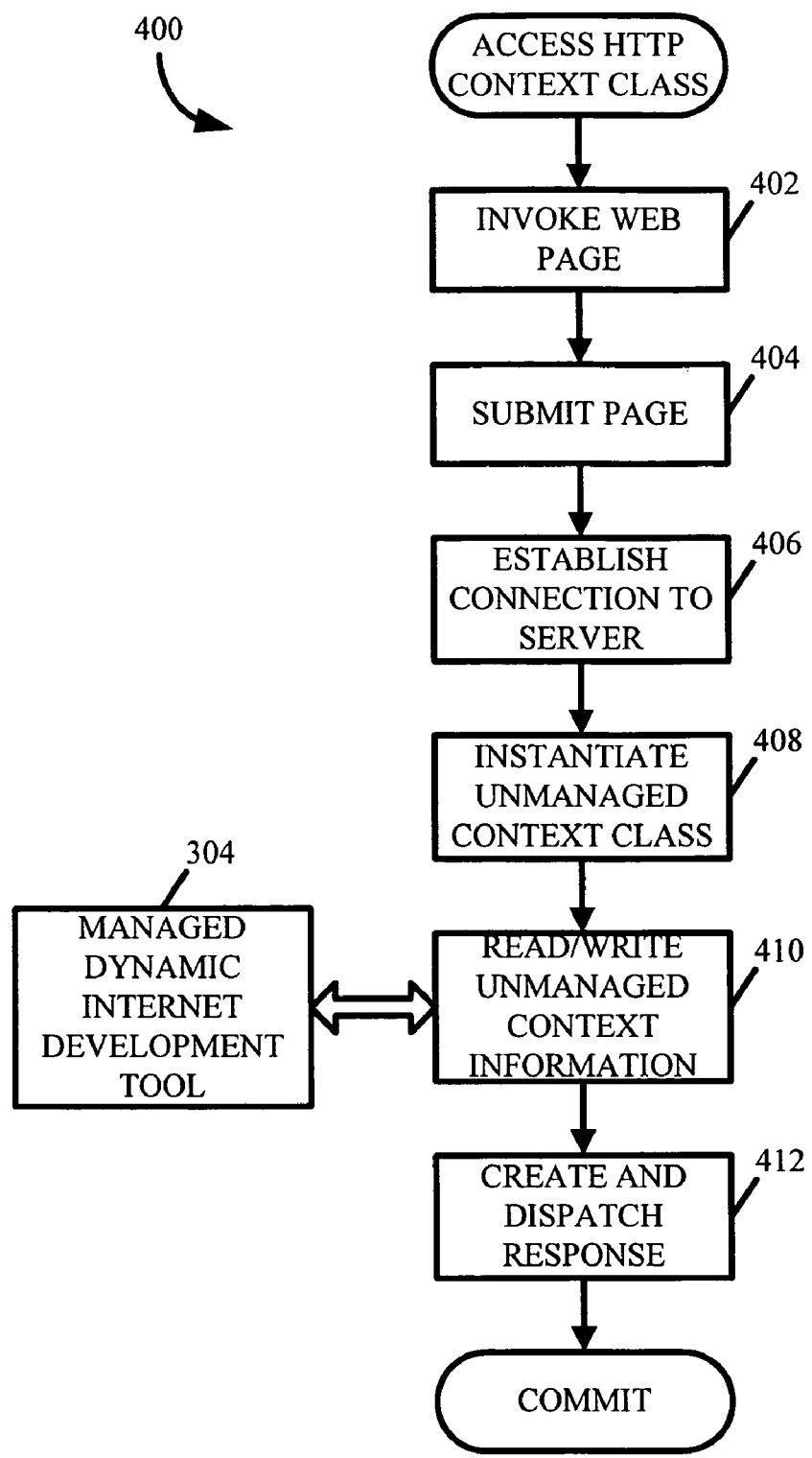
FIG. 5 is a flowchart representative of a routine for accessing and using unmanaged Internet protocol context classes.

FIG. 5 is an example of a routine 400 which may be executed all or in part in the interoperability component 306 kernel, and which may be utilized to access and use an unmanaged Internet protocol context class, such as an X++HTTP context class. Beginning at block 402, a managed Internet page or application implemented using an unmanaged programming language is invoked. The managed Internet page or application may be an active server page or application implemented using X++. The managed Internet page or application may be invoked using the Internet browser 312, for example, when a client initiates (e.g., opens) the Internet browser 312 which may cause a request to be submitted to the Internet information server 302. The Internet information server 302 may cause the managed Internet page or application to be displayed or executed on the client system 206. For example, invoking a managed Internet page at block 402 may cause a form to be displayed in the Internet browser 312.

At block 404, the managed Internet page or application may be submitted to the Internet server 214. For example, the user may manipulate the form generated on the Internet browser 312, or otherwise manipulate the Internet page contents depending on the functionality of the page, and submit the results back to the Internet information server 302. In another example, the user may execute a client-side Internet application accessed via the Internet browser 312 and return the results to the Internet information server 302. The code associated with the Internet page or application may connect to the Internet information server 302, and/or the server system 202, via the interoperability component 306 at block 406.

At block 408, the Internet information server 302 executes and accesses the code of the Internet page or application. Execution of the code calls into the interoperability component 306, and the execution may include one or more Internet protocol context class calls from the code. At block 408, receipt of the unmanaged Internet protocol context call instantiates the appropriate unmanaged Internet context class being called, such as an X++HTTP context class that a managed active server page Internet page or Internet application needs to use.

At block 410, the routine 400 interacts with the managed dynamic Internet development technology tools (e.g., ASP-.NET). In particular, once the unmanaged Internet context class has been instantiated, the Internet page or application may use the unmanaged Internet context classes to communicate with the dynamic Internet development technology tools (e.g., query parameters to be passed to the client, send the response back, etc.) and access the managed Internet protocol context (e.g., the managed active server page HTTP context). As such, Internet protocol context information is read and/or written in the unmanaged programming language at block 410 depending on the particular unmanaged Internet context class(es) instantiated at block 408. In one example, managed Internet protocol context information (e.g., managed active server page HTTP context information) is retrieved from the managed dynamic Internet development tools 304. Because each unmanaged Internet context class is mapped to a corresponding managed Internet context class of the managed dynamic Internet development tools, interaction with the managed dynamic Internet development tools may be accomplished by using the unmanaged Internet context class to interact with the corresponding managed Internet context classes. In other words, the Internet page or application may communicate with the managed dynamic Internet development tools 304 via the unmanaged Internet protocol context classes and corresponding managed Internet protocol context classes, even though the Internet page or application is implemented in an unmanaged programming language.

Using the information read and/or written at block 410, a response is generated at block 412 and dispatched to the Internet browser 312. In particular, the interaction of block 410 is used at block 412 to create and dispatch a response to the client.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A computer-readable storage medium having computer-executable instructions for implementing a method of accessing managed Internet protocol context information in response to a unmanaged Internet application, the computer executable instructions comprising instructions for:

receiving an unmanaged Internet protocol context class call from an Internet application written in an unmanaged programming language;

instantiating an unmanaged Internet protocol context class written in an unmanaged programming language in response to the unmanaged Internet protocol context class call, wherein the unmanaged Internet protocol context class call is not native to a system instantiating the unmanaged Internet protocol context class, and wherein the unmanaged Internet protocol context class is native to the system instantiating the unmanaged Internet protocol context class and the unmanaged Internet protocol context class is natively mapped within the system to a corresponding managed Internet protocol context class native to the system and written in a managed programming language, whereby the mapped unmanaged Internet protocol context class is represented as native within the system to the corresponding managed Internet protocol context class;

interacting with the corresponding managed Internet protocol context class, whereby the mapped unmanaged Internet protocol context class is used to communicate directly and natively on the system with the corresponding managed Internet protocol context class; and accessing managed Internet protocol context information in response to interacting with the corresponding managed Internet protocol context class.

2. The computer-readable storage medium having computer-executable instructions of claim 1, further comprising instructions for invoking a managed active server page programming language to execute the unmanaged programming language.

3. The computer-readable storage medium having computer-executable instructions of claim 1, further comprising instructions for:

generating a response based on the Internet protocol context information; and dispatching the response to the Internet application.

4. The computer-readable storage medium having computer-executable instructions of claim 1, wherein receiving an unmanaged Internet protocol context class call from an Internet application written in an unmanaged programming language comprises receiving an unmanaged request/response Internet protocol context class call from a managed Internet application written in an unmanaged programming language, wherein instantiating an unmanaged Internet protocol context class written in an unmanaged programming language in response to the unmanaged Internet protocol context class call comprises instantiating an unmanaged request/response Internet protocol context class written in an unmanaged programming language in response to the unmanaged request/response Internet protocol context class call, wherein interacting with the corresponding managed Internet protocol context class comprises directly interacting with a managed request/response Internet protocol context class, and wherein accessing Internet protocol context information in response to interacting with the corresponding managed Internet protocol context class comprises receiving request/response Internet protocol context information in response to interacting with the managed request/response Internet protocol context class.

5. The computer-readable storage medium having computer-executable instructions of claim 1, wherein receiving an unmanaged Internet protocol context class call from an Internet application written in an unmanaged programming language comprises receiving an unmanaged HyperText Transfer Protocol (HTTP) context class call from a managed Internet application written in an unmanaged programming language, wherein instantiating an unmanaged Internet protocol context class written in an unmanaged programming language in response to the unmanaged Internet protocol context class call comprises instantiating an unmanaged HTTP context class written in an unmanaged programming language in response to the unmanaged Internet protocol context class call, wherein interacting with the corresponding managed Internet protocol context class comprises interacting with a managed HTTP context class, and wherein accessing Internet protocol context information in response to directly interacting with the corresponding managed Internet protocol context class comprises receiving HTTP context information in response to directly interacting with the managed HTTP context class.

6. The computer-readable storage medium having computer-executable instructions of claim 1, wherein receiving an unmanaged Internet protocol context class call from an Internet application written in an unmanaged programming language comprises receiving an X++ HyperText Transfer Protocol (HTTP) context class call from a managed active server page Internet application built using X++ programming language, wherein instantiating an unmanaged Internet protocol context class written in an unmanaged programming language in response to the unmanaged Internet protocol context class call comprises instantiating an X++ HTTP context class written in X++ programming language in response to the X++ HTTP context class call, wherein interacting with the corresponding managed Internet protocol context class comprises directly interacting with a managed active server page HTTP context class, and wherein accessing managed Internet protocol context information in response to directly interacting with the corresponding managed Internet protocol context class comprises receiving HTTP context information in response to directly interacting with the managed active server page HTTP context class.

7. The computer-readable storage medium having computer-executable instructions of claim 1, wherein directly interacting with a managed Internet protocol context class written in a managed programming language comprises at least one of the group consisting of: reading Internet protocol context information in the unmanaged programming language and writing Internet protocol context information in the unmanaged programming language.

8. The computer-readable storage medium having computer-executable instructions of claim 1, wherein directly interacting with a managed
Internet protocol context class written in a managed programming language comprises using the unmanaged Internet protocol context class to receive Internet protocol context information in response to the managed Internet protocol context class.

9. The computer-readable storage medium having computer-executable instructions of claim 1, wherein accessing Internet protocol context information in response to directly interacting with the managed Internet protocol context class comprises receiving native managed Internet protocol context information in response to directly interacting with the managed Internet protocol context class.

10. A computer-readable storage medium having computer-executable instructions for implementing a method of communicating between a requesting process and a serving process, the computer executable instructions comprising instructions for:

processing an unmanaged Internet protocol context call from an Internet application;

providing direct access to managed Internet protocol context information in response to the unmanaged Internet protocol context call via an unmanaged Internet protocol context class which corresponds to a managed Internet protocol context class, wherein the unmanaged Internet protocol context call is not native to a system processing the unmanaged Internet protocol context class call, and wherein the unmanaged Internet protocol context class is native to the system processing the unmanaged Internet protocol context class call and wherein the unmanaged Internet protocol context class is natively mapped within the system to a corresponding managed Internet protocol context class native to the system and written in a managed programming language, whereby the mapped unmanaged Internet protocol context class is represented as native within the system to the corresponding managed Internet protocol context class;

interacting with the corresponding managed Internet protocol context class, whereby the mapped unmanaged Internet protocol context class is used to communicate directly and natively on the system with the corresponding managed Internet protocol context class; and providing a response to the unmanaged Internet protocol context call based on the managed Internet protocol context information in response to interacting with the corresponding managed Internet protocol context class.

11. The computer-readable storage medium of claim 10, wherein processing an unmanaged Internet protocol context call comprises:
   issuing, by the requesting process, the unmanaged Internet protocol context call for an unmanaged Internet protocol context class;
   receiving, by the serving process, the unmanaged Internet protocol context call for the unmanaged Internet protocol context class; and
   instantiating, by the serving process, the unmanaged Internet protocol context class called by the unmanaged Internet protocol context call.

12. The computer-readable storage medium of claim 10, wherein providing direct access to managed Internet protocol context information in response to the unmanaged Internet protocol context call via an unmanaged Internet protocol context class comprises using, by the serving process, the unmanaged Internet protocol context class to communicate with a managed dynamic Internet page development tool.

13. The computer-readable storage medium of claim 10, wherein providing a response to the unmanaged Internet protocol context call based on the managed Internet protocol context information comprises:
   creating, by the serving process, a response to the unmanaged Internet protocol context call from the managed Internet protocol context information; and
   dispatching, from the serving process to the requesting process, the response to the unmanaged Internet protocol context information.

14. The computer-readable storage medium of claim 10, wherein providing a response to the unmanaged Internet protocol context call based on the managed Internet protocol context information comprises one or more of the group consisting of:
   reading, by the serving process, Internet protocol context information in the unmanaged programming language; and
   writing, by the serving process, Internet protocol context information in the unmanaged programming language.

15. The computer-readable storage medium of claim 10, wherein the serving process comprises an Internet Information Server (IIS) having an interoperability component comprising one or more unmanaged Internet protocol context classes.

16. The computer-readable storage medium of claim 10, wherein providing direct access to managed Internet protocol context information in response to the unmanaged Internet protocol context call via an unmanaged Internet protocol context class which corresponds to a managed Internet protocol context class comprises providing access to managed HyperText Transfer Protocol (HTTP) context information in response to an X++ HTTP context call via an X++ HTTP context class which corresponds to a managed active server page class.

17. A computer adapted for participation in an Internet-based enterprise resource planning system, the computer comprising:
   a network communication device for receiving data via a network;
   a memory storing machine-readable instructions; and
   a processor for executing the machine-readable instructions performing a method comprising:
      receiving a call from a managed active server page Internet application written in an unmanaged programming language at a managed Internet information server;
      accessing an unmanaged HyperText Transfer Protocol (HTTP) context class via an unmanaged programming language interpreter in response to the call,
   wherein the call is not native to the computer, and wherein the unmanaged HTTP context class is native to the computer, and the unmanaged HTTP context class is natively mapped within the computer to a corresponding managed HTTP context class native to the system and written in a managed programming language, whereby the mapped unmanaged HTTP context class is represented as native within the computer to the corresponding managed HTTP context class;
      accessing managed active server page HTTP context information via the corresponding managed HTTP context class whereby the mapped unmanaged HTTP context class is used to communicated directly and natively on the computer with the corresponding managed HTTP protocol context class; and
      dispatching a response to the managed active server page Internet application based on the managed active server page HTTP context information in response to interacting with the corresponding managed HTTP context class.

18. The computer of claim 17, wherein directly accessing managed active server page HTTP context information comprises directly interacting with a managed dynamic Internet page development tool.

19. The computer of claim 17, wherein directly accessing managed active server page HTTP context information comprises at least one of the group consisting of:
   reading HTTP context information from a managed dynamic Internet page development tool in the unmanaged programming language; and
   writing HTTP context information from a managed dynamic Internet page development tool in the unmanaged programming language.

* * * * *